(12) United States Patent
Arai

(10) Patent No.: US 8,701,875 B2
(45) Date of Patent: Apr. 22, 2014

(54) BELT-DRIVING ROLLER FOR DRIVING WIRE MESH BELT AND FOOD MANUFACTURING APPARATUS USING THE SAME

(75) Inventor: Seiichi Arai, Saitama (JP)

(73) Assignee: Arai Foods Machinery Co., Ltd., Saitama (JP)

( * ) Notice: Subject to any disclaimer, the term of this patent is extended or adjusted under 35 U.S.C. 154(b) by 0 days.

(21) Appl. No.: 13/519,167

(22) PCT Filed: Jun. 21, 2011

(86) PCT No.: PCT/JP2011/003517
§ 371 (c)(1),
(2), (4) Date: Jun. 26, 2012

(87) PCT Pub. No.: WO2011/161941
PCT Pub. Date: Dec. 29, 2011

(65) Prior Publication Data
US 2012/0292160 A1  Nov. 22, 2012

(30) Foreign Application Priority Data
Jun. 23, 2010  (JP) .................. 2010-142370

(51) Int. Cl.
*B65G 23/06*  (2006.01)
(52) U.S. Cl.
USPC .......................................... 198/834; 198/848

(58) Field of Classification Search
USPC ................... 198/834, 835, 848, 842
See application file for complete search history.

(56) References Cited

U.S. PATENT DOCUMENTS

| | | | | |
|---|---|---|---|---|
| 4,685,557 A | * | 8/1987 | Roinestad ..................... | 198/834 |
| 5,074,406 A | * | 12/1991 | Gundlach et al. ............. | 198/834 |
| 5,156,263 A | * | 10/1992 | Ledet ............................ | 198/834 |
| 5,170,883 A | * | 12/1992 | Ledet et al. .................. | 198/834 |
| 5,253,748 A | * | 10/1993 | Ledet ............................ | 198/834 |
| 5,263,575 A | * | 11/1993 | Ledet ............................ | 198/834 |
| 7,565,967 B2 | * | 7/2009 | Maine et al. .................. | 198/835 |

FOREIGN PATENT DOCUMENTS

JP  2002-120919  4/2002

* cited by examiner

*Primary Examiner* — Gene Crawford
*Assistant Examiner* — Keith R Campbell
(74) *Attorney, Agent, or Firm* — Notaro, Michalos & Zaccaria P.C.

(57) ABSTRACT

Provided is a belt-driving roller that can be manufactured at low cost for driving a wire mesh belt used as a conveyor belt in a circulating manner, and also provided is a food manufacturing apparatus using the driving roller. A belt-driving roller comprises: a rotation shaft; and toothed rollers concentrically attached to the outer circumference of the rotation shaft. The toothed roller comprises: a cylindrical base part on the outer circumference of which teeth are provided in a plurality of rows to engage with a wire mesh belt; and an attachment means for attaching the base part to the rotation shaft. The belt-driving roller is used in a food manufacturing apparatus.

16 Claims, 16 Drawing Sheets

BELT-DRIVING ROLLER FOR DRIVING WIRE MESH BELT AND FOOD MANUFACTURING APPARATUS USING THE SAME

TECHNICAL FIELD

The present invention relates to a belt-driving roller for a wire mesh belt, which is preferably used for driving the wire mesh belt in an endless belt intended for food transfer e.g. in food manufacturing apparatus, as well as the food manufacturing apparatus using the belt-driving roller.

BACKGROUND ART

Conventionally, a belt-driving roller for a wire mesh belt used in particular as an endless food transfer conveyor belt—as is disclosed in the following Patent Document 1 is known. In the belt-driving roller according to the Patent Document 1, tooth portions are provided in an axial direction along the entire outer circumference, and the tooth portions lock meshes of the wire mesh belt in a lateral direction, in order to drive the wire mesh belt in a circulating manner.

PRIOR ART

Patent Document 1: JP Laid-Open Patent Application No. 2002-120919

SUMMARY OF THE INVENTION

Problems to be Solved by the Invention

Toothed rollers according to the above-mentioned document necessitates enormous efforts and costs for processing, since it is necessary to machine a cylindrical bar into a roller with tooth portions, to shape tooth portions on a cast object or to attach tooth portions to an outer circumference of a cylindrical bar, so as to provide tooth portions in circumferential and axial directions on an outer circumference of a single shaft. Therefore, the rollers lead to increased costs. Unlike these rollers, a belt-driving roller has been also proposed, wherein it is manufactured by arranging solid narrow toothed rollers spaced from each other as necessary in axial direction, wherein each of the toothed rollers is provided with three rows of tooth portions in circumferential direction. However, even this belt-driving roller has a problem in that it still necessitates high manufacturing costs.

An object of the invention is to provide a belt-driving roller for a wire mesh belt used as conveyor belt in a circulating manner, which is manufactured at a low cost, as well as the food manufacturing apparatus using the belt-driving roller.

Means for Solving the Problems

To solve the above-mentioned object, the first aspect of the invention is characterized in that a belt-driving roller of a wire mesh belt for suspending an endless mesh belt from an outer circumference thereof and driving it in a circulating manner, said belt-driving roller comprising a rotation shaft; toothed rollers concentrically so attached to said rotation shaft that the toothed rollers are spaced from each other at a predetermined interval in axial direction of the rotation shaft; and spacer rollers so provided between the toothed rollers and concentrically attached to the rotation shaft in axial direction of the rotation shaft; wherein the rotation shaft comprises a flange portion on one end portion thereof, and is provided with a key portion on an outer circumference of the rotation shaft in axial direction; wherein each of the toothed rollers comprises an attaching cylindrical body having an insertion locking hole provided with a key groove engaging with the key portion, the attaching cylindrical body being attached to the rotation shaft, a pair of lid bodies spaced from each other and attached to the attaching cylindrical body, a cylindrical base material portion attached to outer circumferences of both lid bodies and provided with tooth portions in a plurality of rows on an outer circumference of the base material portion, the tooth portions being meshed with the wire mesh belt; wherein each of the spacer rollers comprises a pair of disc-shaped lid bodies attached to the attaching cylindrical body and to the rotation shaft, wherein a receiving hole is provided on one of the disc-shaped lid bodies, the attaching cylindrical body being inserted into the receiving hole, and wherein an insertion locking hole with a key groove is provided on other of the lid bodies, the key groove engaging with the key portion, and a cylindrical body attached to outer circumferences of both lid bodies by spacing from each other at predetermined interval; wherein each of the spacer rollers and each of the toothed rollers are arranged one after another, and all of thus arranged rollers are clamped from one end side, so that the spacer rollers and the toothed rollers are fixed to each other in axial direction of the rotation shaft.

The second aspect of the invention is characterized in that each of the toothed rollers further comprises a pair of toothed discs so attached to the outer circumference of the attaching cylindrical body that the toothed discs are spaced from each other at a predetermined interval, each of the toothed discs being provided with a plurality of tooth portions on outer circumferences thereof, and a cylindrical spacer member attached between both toothed discs, so as to be concentric with the toothed discs.

The third aspect of the invention is characterized in that each of the toothed rollers further comprises a plurality of toothed discs so attached to the rotation shaft that the toothed discs are spaced from each other at a predetermined interval in axial direction, each of the toothed discs having an attaching hole provided with a key groove engaging with the key portion and being provided with a plurality of tooth portions on outer circumferences of each of the toothed discs, and a plurality of cylindrical spacer members, each of the spacer members being attached between two of the toothed discs, so as to be concentric with the toothed discs.

The fourth aspect of the invention is characterized in that the width of each of the toothed rollers in axial direction is substantially equal to that of each of the spacer rollers in axial direction.

The fifth aspect of the invention is characterized in that the width of each of the toothed rollers in axial direction is smaller than that of each of the spacer rollers in axial direction.

The sixth aspect of the invention is characterized in that one of the spacer rollers adjacent at least to one side of one of the toothed rollers is firmly fixed to the one side of one of the toothed rollers.

Still further, the invention is characterized in that in the toothed rollers according to either one of claims 1 to 3 the tooth portions are displaced in circumferential direction on one of the toothed discs, as compared to the ones on other discs.

Still further, the invention is characterized in that the spacer rollers have an outer diameter equal to that of the toothed rollers without the tooth portions.

Still further, the invention is characterized in that the toothed rollers are formed using a wire cutting machine when the tooth portions are provided on an outer circumference of the cylindrical base material portion.

Still further, the invention is characterized in that the toothed rollers are formed using a laser cutting machine when the tooth portions are provided on an outer circumference of the disc-shaped base material portion.

Still further, the invention is characterized in that the wire mesh belt of the food manufacturing apparatus is driven in a circulating manner using the belt-driving roller.

In this regard, the invention is characterized in that the food manufacturing apparatus is in particular a hot-air drying apparatus for rice-cake confectionary.

Moreover, the invention is characterized in that the food manufacturing apparatus is in particular a baking apparatus for rice-cake confectionary.

Effects of the Invention

The invention is configured as above described, so that the belt-driving roller from which the wire mesh belt being a conveyor belt of the food manufacturing apparatus for transferring a food dough is suspended and driven thereon in a circulating manner can be manufactured at low cost. In this manner, the manufacturing cost of the food manufacturing apparatus using the wire mesh belt as transfer conveyor can be greatly reduced.

BEST MODE FOR CARRYING OUT THE INVENTION

Figure 1:
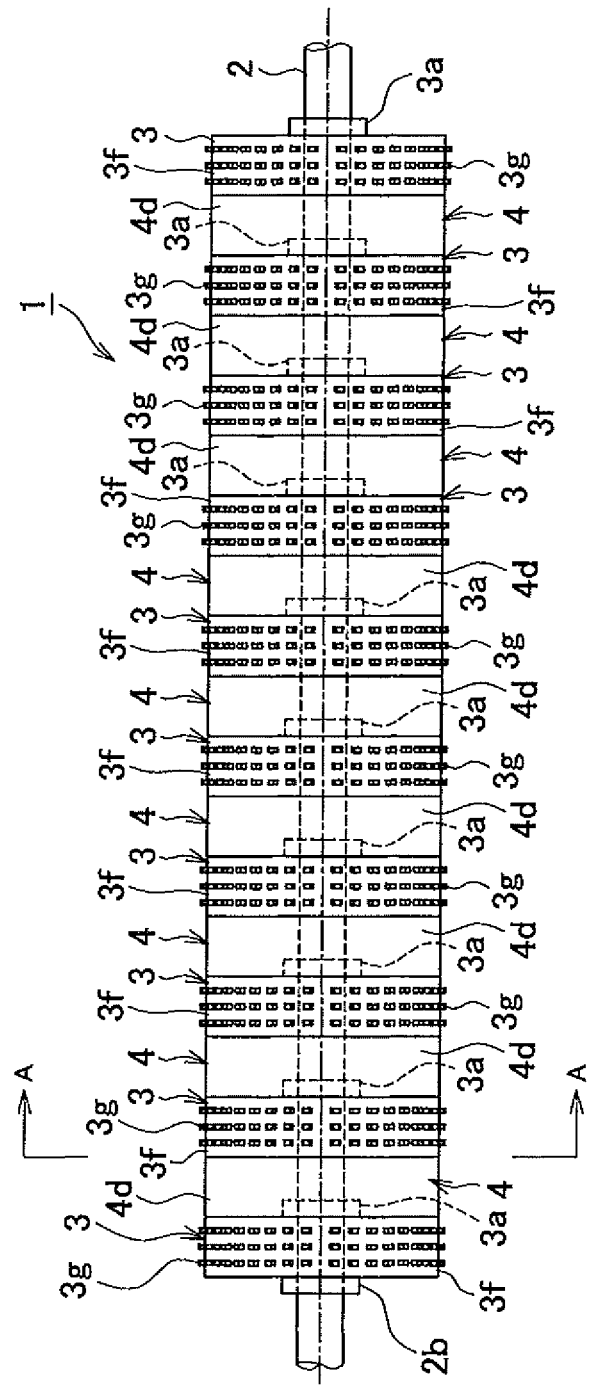
FIG. 1 is an elevation view of a belt-driving roller for a wire mesh belt according to the invention.
Figure 2:
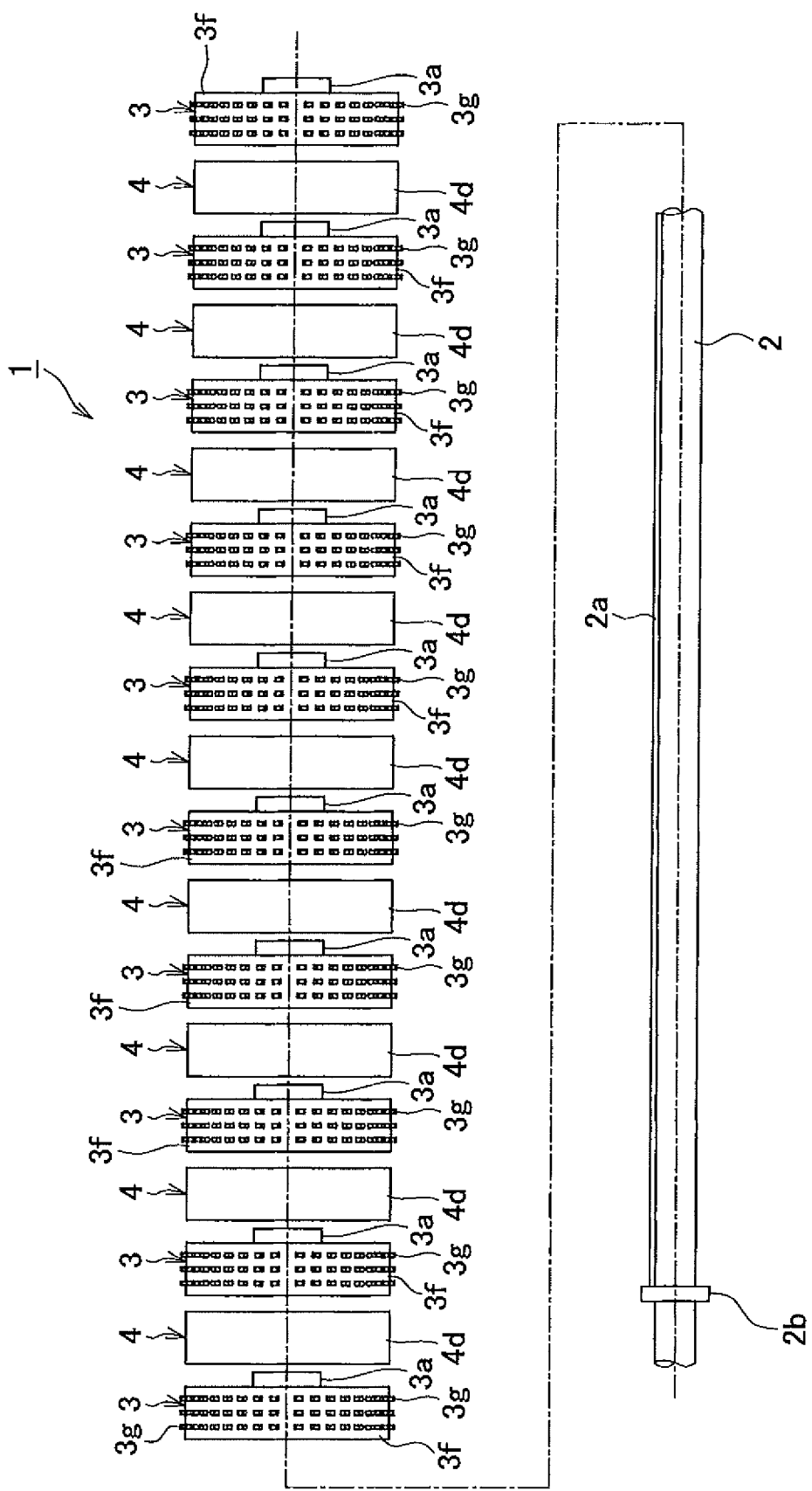
FIG. 2 is an explosive elevation view of a belt-driving roller as shown in FIG. 1.

In the following, best modes for embodiment of the invention are described based on the accompanying drawings.

Embodiment 1

Reference numeral 1 in FIGS. 1 to 5 denotes a belt-driving roller according to the invention. The belt-driving roller 1 comprises a rotation shaft 2 made of stainless steel such as SUS with a key portion 2a in axial direction on an outer circumference, a plurality of toothed rollers 3, wherein the rotation shaft 2 is inserted into an insertion locking hole 3b of an attaching cylindrical body 3d being attaching means provided in axial direction on the central portion of one of the toothed rollers, and spacer rollers 4 provided between each pair of the toothed rollers 3, each of them having a receiving hole 4a of an insertion projection portion 3a provided on one side end portion and in axial direction on the central portion and an insertion locking hole 4b of the rotation shaft 2 provided on other side end portion and in axial direction on the central portion, wherein the rotation shaft 2 is inserted into the insertion locking hole 4b thereof, and a key groove 4c thereof is engaged with the key portion 2a of the rotation shaft 2. As per the toothed rollers 3 and the spacer rollers 4, one of the toothed rollers 3 located on one end portion is first brought into contact with a flange portion 2b provided e.g. on one end portion, next, one of the spacer rollers 4 and one of the toothed rollers 3 are arranged one after another, respectively with the insertion projection portion 3a of the attaching cylindrical body 3d of each of the toothed rollers 3 being inserted into the receiving hole 4a of each of the spacer rollers 4, and then one of the toothed rollers 3 located on other end portion is firmly fixed onto the circumference of the rotation shaft 2, by a clamping nut (not shown) screwed via a washer (not shown) on the male screw portion (not shown) provided on the rotation shaft 2.

In the meantime, it is optional to weld each of toothed rollers 3 and each of spacer rollers 4 with each other, or to weld each of the toothed rollers 3 and each of the spacer rollers 4 with a rotation shaft 2. Moreover, it can be freely selected whether an insertion projection portion 3a is provided on an attaching cylindrical body 3d or not, and it is optional to place a key portion or a key groove on the outside of the insertion projection portion 3a.

Furthermore, a belt-driving roller 1 is used herein, but the belt-driving roller 1 includes not only a belt-driving roller rotated via a driving force transmitting means by a driving motor, but also a driven roller rotated via a wire mesh belt by a driving force of the belt-driving roller.

Figure 3:
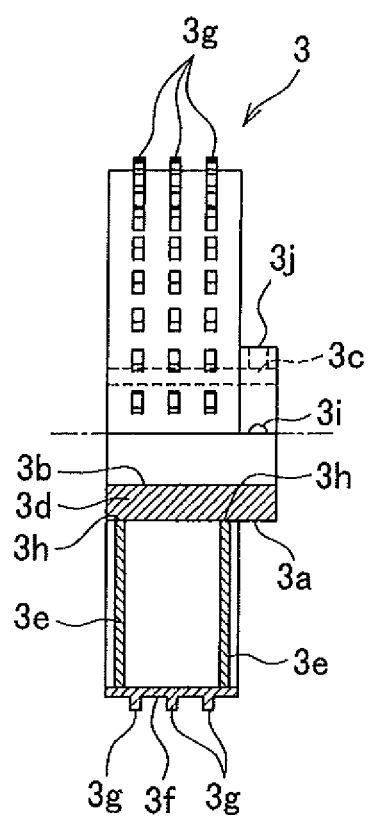
FIG. 3 is a partial enlarged sectional view of tooth portions of a belt-driving roller according to the invention.
Figure 4:
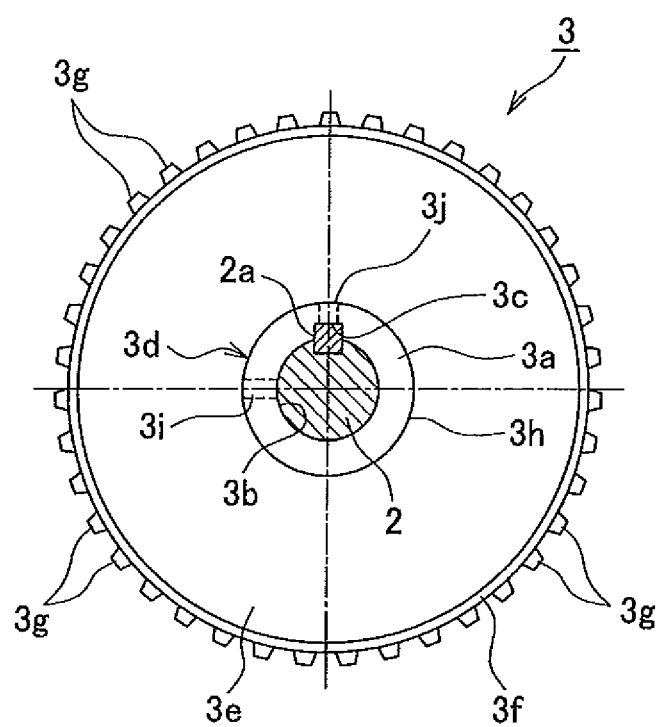
FIG. 4 is an enlarged sectional view of FIG. 1 in line A-A.

As shown in a partial enlarged sectional view thereof in FIG. 3 and a sectional view of FIG. 1 in line A-A in FIG. 4, a toothed roller 3 comprises an attaching cylindrical body 3d made of stainless steel like SUS and being an attaching means having a key groove 3c in axial direction on the central portion and provided with an insertion locking hole 3b for a rotation shaft 2, and a cylindrical base material portion 3f concentrically attached to the attaching cylindrical body 3d via a pair of lid bodies 3e, 3e as connecting members being attaching means as well, which are attached to the outer circumference of the attaching cylindrical body 3d at a predetermined distance. As shown in particular in FIG. 4, tooth portions 3g are so provided in three rows on an outer circumference of the base material portion 3f, using processing means such as toothed wheel cutting machine, wire cutting machine and others that they are spaced from each other as necessary in circumferential and axial directions. In the meantime, reference numerals 3i and 3j denote attaching holes for clamping bolts (not shown).

FIGS. 5A and 5B show structure of a spacer roller. The drawings illustrate that the spacer roller 4 according to the embodiment 1 comprises a cylindrical body 4d of material such as SUS and lid bodies 4e, 4e provided on both sides; a receiving hole 4a for receiving a part of an attaching cylindrical body 3d of a toothed roller 3 and an insertion locking hole 4b with a key hole 4c are provided on respective lid bodies 4e, 4e, so as to be coaxial with each other. Moreover, the outer diameter of the spacer roller is equal to that of a toothed roller 3 without tooth portions 3g.

In the meantime, though not shown, a sprocket or pulley for transmitting driving force from a driving motor via a driving force transmitting means to a rotation shaft 2 is attached to the rotation shaft 2.

As is obvious from the foregoing description, according to FIGS. 3 and 4, a toothed roller 3 according to the embodiment 1 is fabricated by fitting an outer circumference of an attaching cylindrical body 3d being an attaching means and provided with an insertion locking hole 3b with a key groove 3c on an axial portion in an axial direction into attaching holes 3h, 3h of lid bodies 3e, 3e being attaching means as well, by arranging toothed cylindrical body 3f on the lid bodies 3e, 3e so as to be concentric with the attaching cylindrical body 3d and by welding therewith. Otherwise, the toothed roller 3 can be fabricated by welding a base material portion 3f with the lid bodies 3e, 3e so as to be concentric therewith, and then fitting the attaching cylindrical body 3d into respective attaching holes 3h, 3h of the lid bodies 3e, 3e and thereupon welding therewith; in this manner, the fabricating method and sequence is not limited.

Furthermore, lid bodies 4e, 4e provided with a receiving hole 4a and an insertion locking hole 4b on both side portions in the same manner as a toothed roller 3 as above described can be concentrically attached to a spacer roller 4.

If constructed in the above-described manner, toothed rollers 3 and spacer rollers 4 can be fabricated at lower costs than by machining solid materials.

Figure 5:
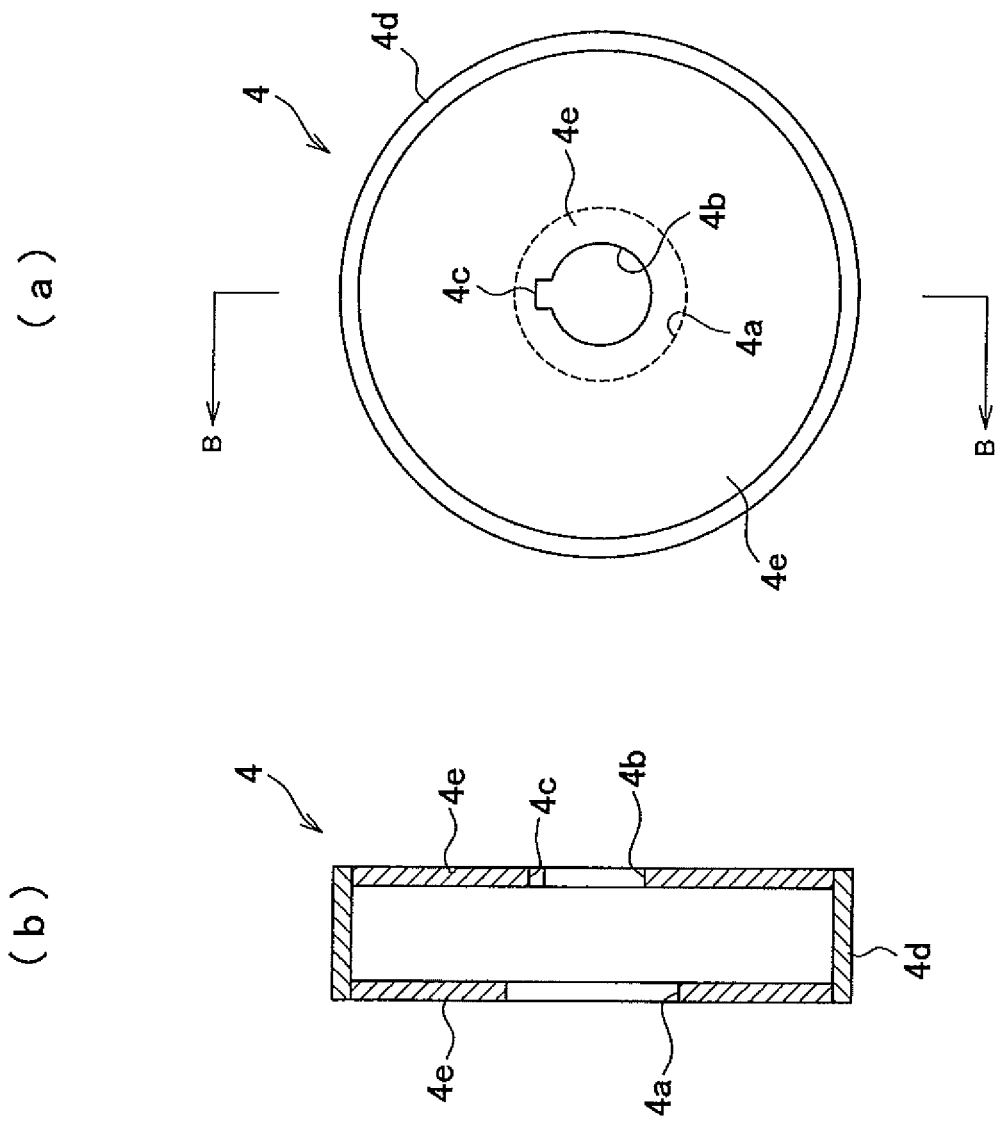
FIG. 5 show a spacer roller of a belt-driving roller as shown in FIG. 1, FIG. 5(a) being a side view thereof, and FIG. 5(b)—a sectional view in line B-B.
Figure 6:
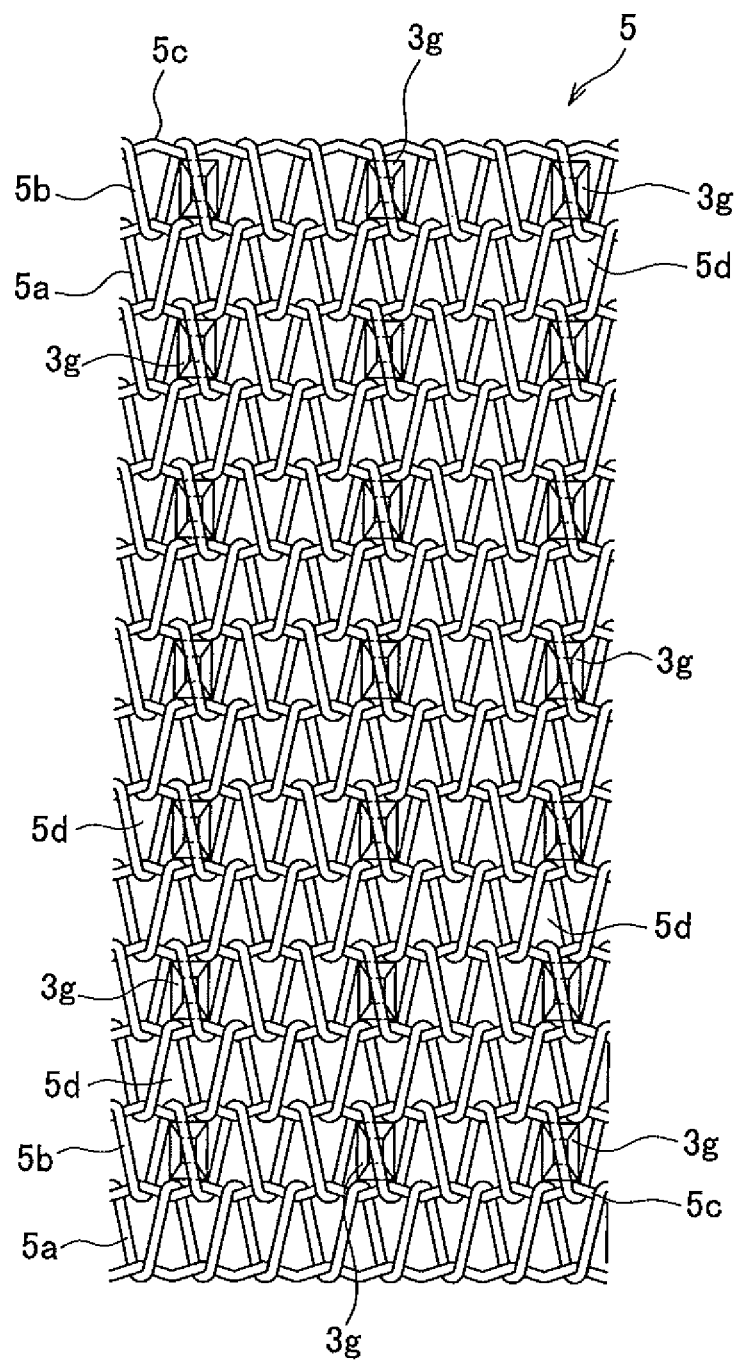
FIG. 6 is an explanatory view of a wire mesh belt suspended from a belt-driving roller according to the invention, as seen from the front side.
Figure 7:
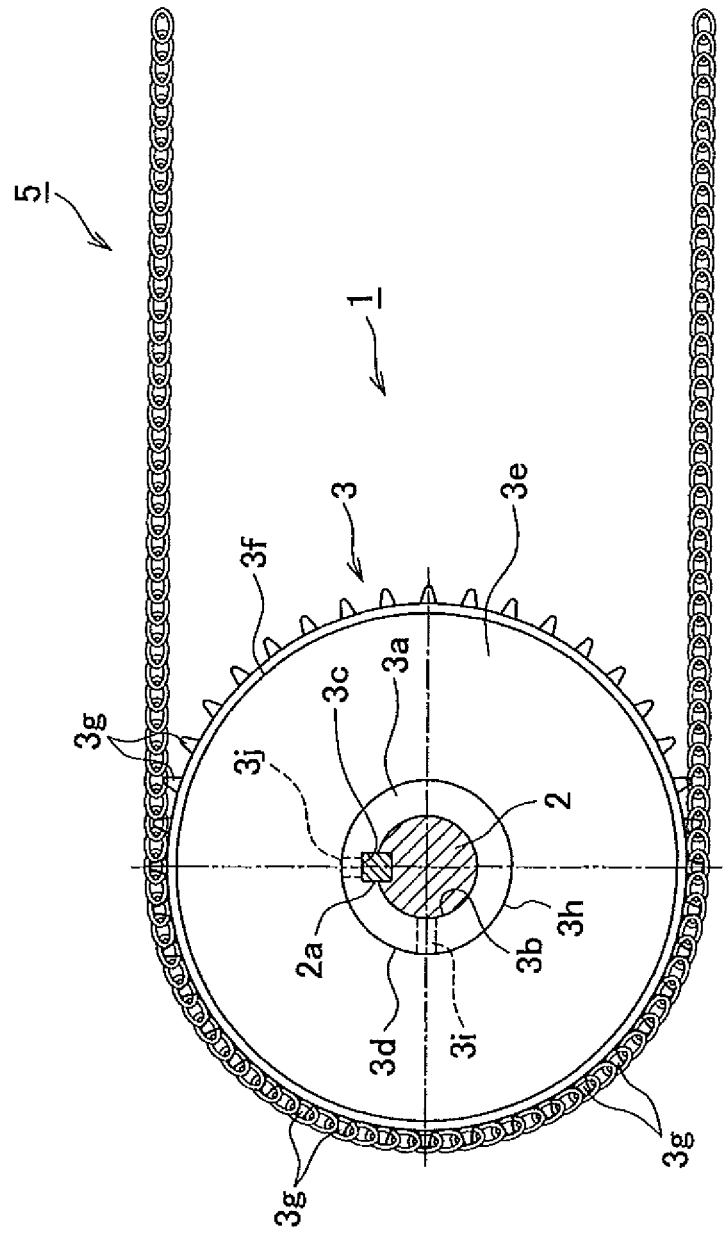
FIG. 7 is a side view of a wire mesh belt suspended from a belt-driving roller according to the invention.

FIGS. 6 and 7 show a wire mesh belt 5 suspended from a belt-driving roller 1 according to the invention. The drawings illustrate that the wire mesh belt 5 is made of zinc-coated wire, stainless steel wire and others and shaped into an endless belt, wherein left-handed twisted wires 5a in spiral shape and right-handed twisted wires 5b in spiral shape as well are alternately connected using connecting rods 5c. Both side end portions of each of the left-handed twisted wires 5a and each of the right-handed twisted wires 5b are respectively welded with connecting rods 5c. We can see that tooth portions 3g are meshed with meshes 5d every one row in a longitudinal direction and every one mesh 5d in a lengthwise direction of the wire mesh belt 5. Of course, the wire mesh belt 5 is suspended from spacer rollers 4 as shown in FIGS. 1 and 5, but the wire mesh belt 5 as suspended from the spacer rollers 4 creates any difference in level, in case that an outer diameter of the spacer roller 4 is equal to that of a toothed roller 3 without tooth portions 3g. Still further, the tooth portions 3g of the toothed roller 3 does not protrude upward from the wire mesh belt 5. Of course, an arrangement with the tooth portions 3g of the toothed roller 3 protruding outside from the wire mesh belt 5 is acceptable as well, depending on the sort of a food manufacturing apparatus.

Embodiment 2

Figure 8:
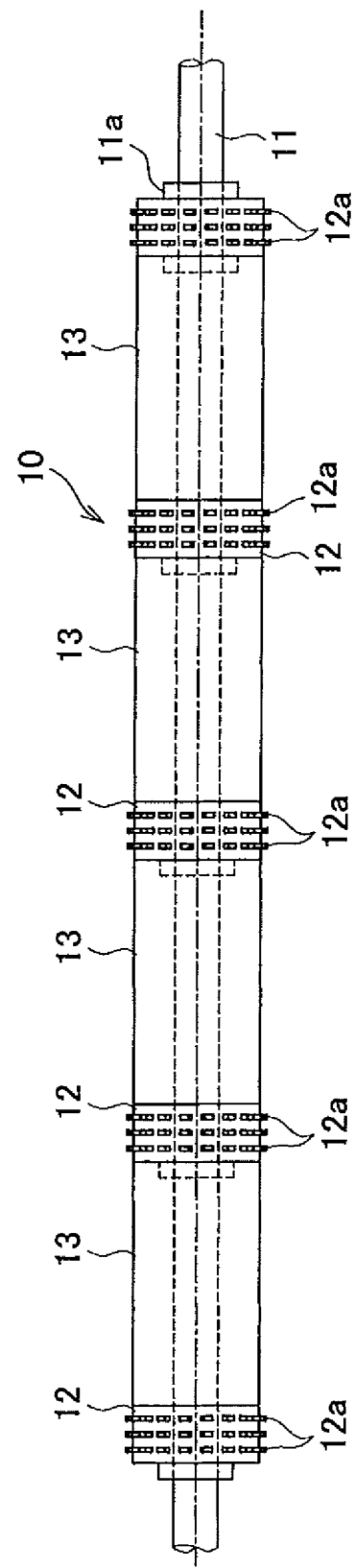
FIG. 8 is an elevation view of another embodiment of a belt-driving roller according to the invention.

FIG. 8 shows another embodiment of a belt-driving roller for a wire mesh belt according to the invention. The drawing illustrates that a total length of a belt-driving roller 10 according to the embodiment 2 is equal to a belt-driving roller 1 according to embodiment 1, but a width of a spacer roller 13 is expanded as compared to embodiment 1, so that number of toothed rollers 12 with tooth portions 12a is smaller than embodiment 1. However, the embodiment is substantially the same as embodiment 1, with all differences in structure and shape of toothed rollers 12 and spacer rollers 13, therefore the relevant description is omitted. The belt-driving roller with smaller number of the toothed rollers 12 is applicable e.g. to a short wire mesh belt with less load being applied. Moreover, the reference numeral 11 denotes a rotation shaft with a flange portion 11a.

Embodiment 3

Figure 9:
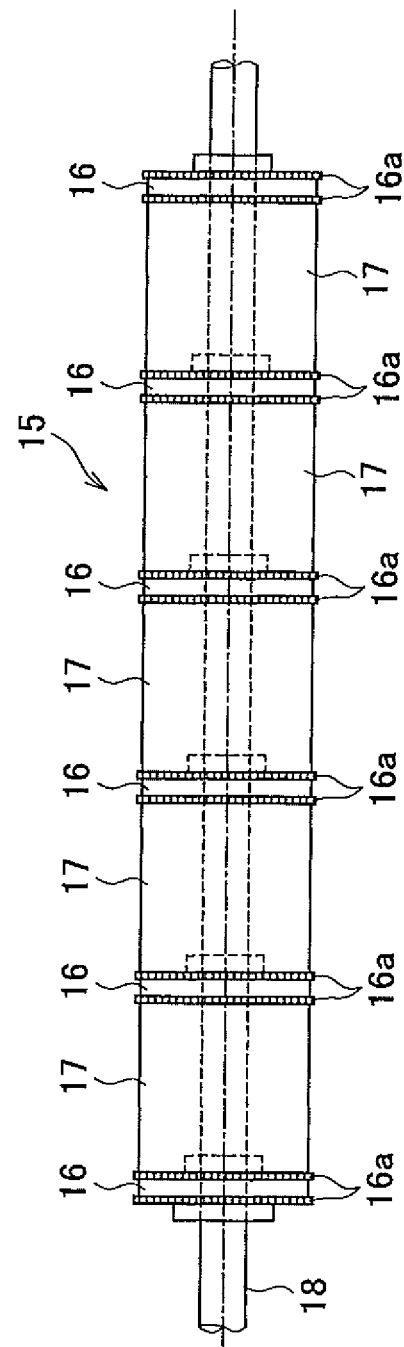
FIG. 9 is an elevation view of another embodiment of a belt-driving roller for a wire mesh belt according to the invention.
Figure 10:
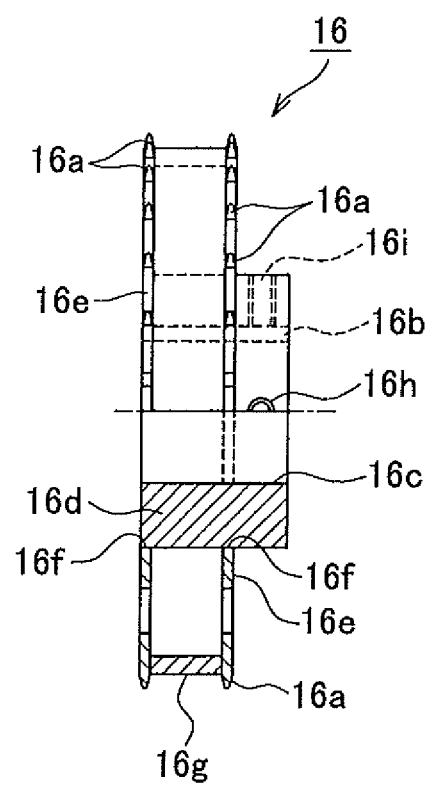
FIG. 10 is a partial enlarged sectional view of a toothed roller of a belt-driving roller shown in FIG. 9.
Figure 11:
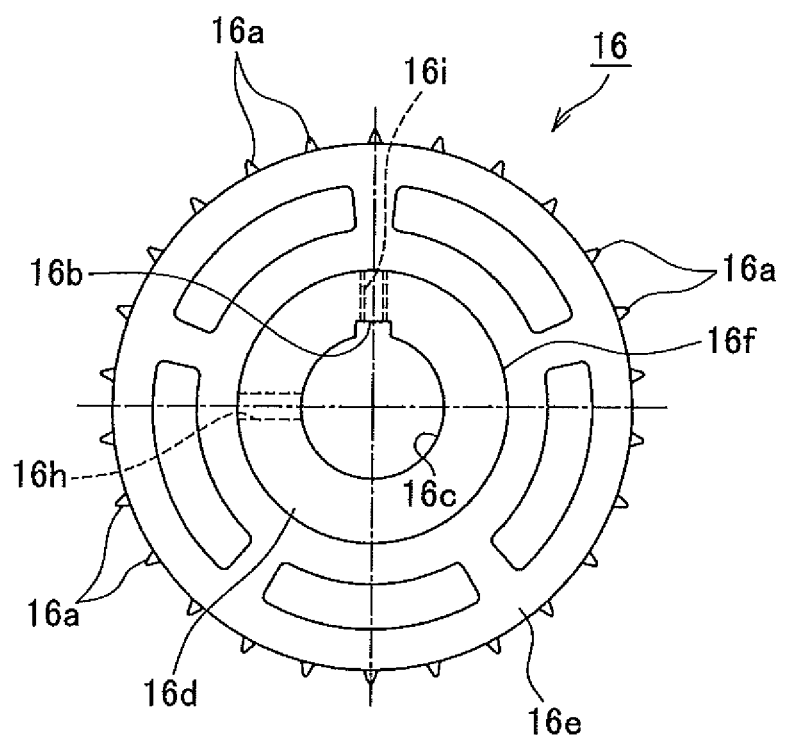
FIG. 11 is a side sectional view of a toothed roller of a belt-driving roller shown in FIG. 9.

FIGS. 9 to 11 show still other embodiment of a belt-driving roller for a wire mesh belt according to the invention. The drawings illustrate that a toothed roller 16 of a belt-driving roller 15 according to embodiment 3 has a plurality of tooth portions 16a in two rows. Otherwise, the structure of spacer rollers 17 and a rotation shaft 18 is substantially the same as embodiments 1 and 2, with all differences in dimension and shape, therefore the relevant description is omitted.

However, a structure of a toothed roller 16 according to the embodiment 3 is different from the above-mentioned embodiments. As shown in particular in FIGS. 10 and 11, the toothed roller 16 comprises an attaching cylindrical body 16d being an attaching means, wherein an insertion locking hole 16c with a key hole 16b for a rotation shaft 18 is provided on the central portion; toothed discs 16e, 16e, wherein a plurality of tooth portions 16a is provided on a pair of outer circumferences welded with an outer circumference of the attaching cylindrical body 16d via attaching holes 16f, 16f at a predetermined interval; a circular spacer member 16g of a diameter greater than the attaching cylindrical body 16d, which is concentrically welded with the attaching cylindrical body 16d between a pair of the toothed discs 16e, 16e. In the meantime, reference numerals 16h and 16i denote attaching holes for clamping bolts (not shown). Moreover, an outer diameter of the spacer member 16g is substantially equal to that of the toothed disc 16e without the tooth portions 16a. Still further, the toothed discs 16e can be processed using both a toothed wheel cutting machine and laser cutting machine, but it is preferable in view of manufacturing cost reduction to use a laser cutting machine in order to provide the tooth portions 16a.

Still further, all the above-described embodiments 1 to 3 show that each of toothed rollers and each of spacer rollers are alternately attached, but arrangements are conceivable, wherein each of toothed rollers and each of spacer rollers are spaced from each other, and exclusively toothed rollers are used.

Still further, an attaching means for each toothed roller is acceptable, wherein an attaching cylindrical body is omitted, and an insertion locking hole into which a rotation shaft is inserted and engaged therewith is provided on lid bodies and toothed discs attached to a side portion of a cylindrical base material portion, so that the insertion locking hole serves as attaching means.

Embodiment 4

Figure 12:
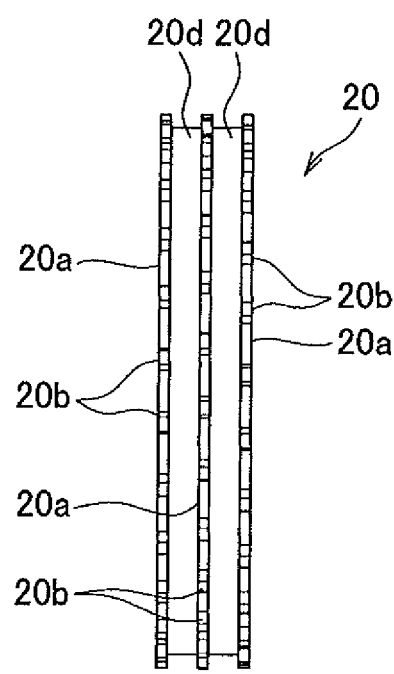
FIG. 12 is an elevation view of still other embodiment of a toothed roller of a belt-driving roller.
Figure 13:
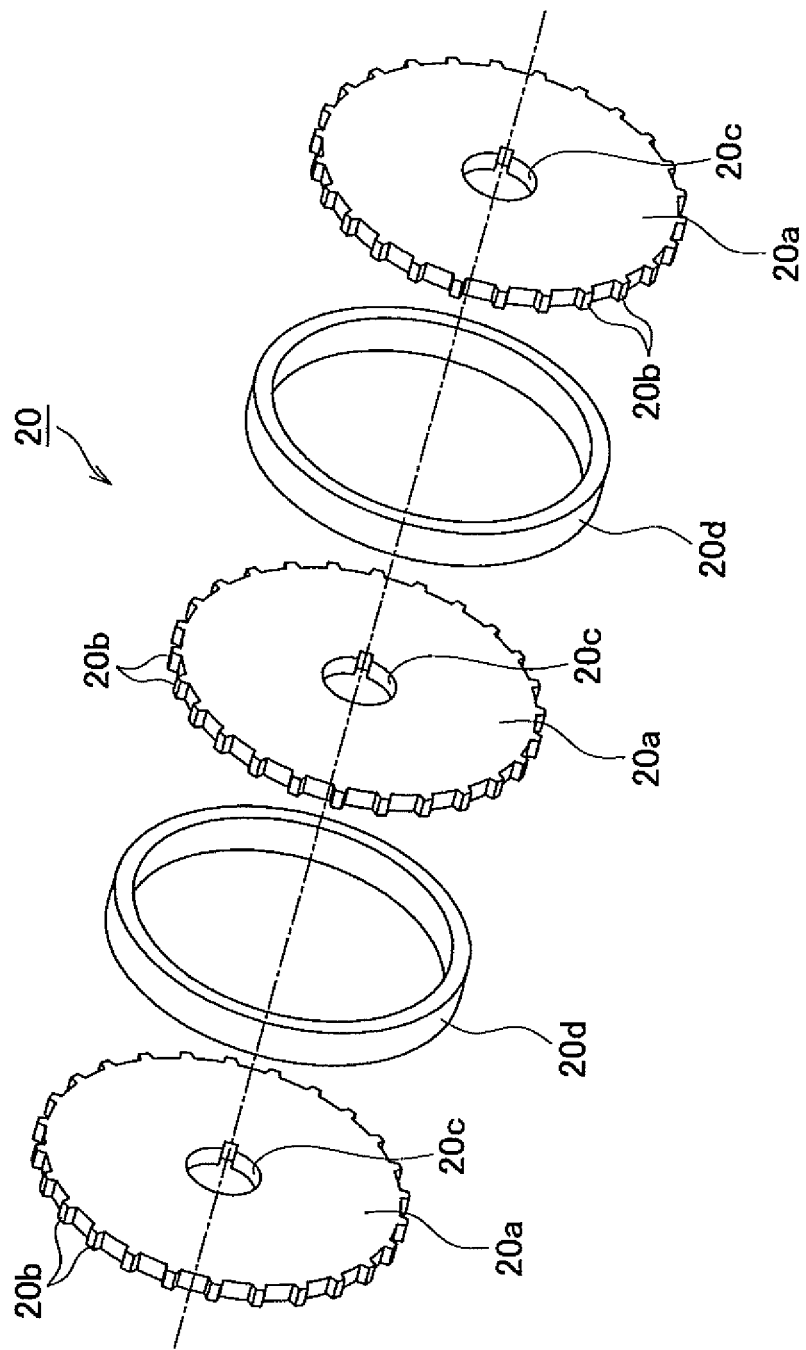
FIG. 13 is an explosive perspective view of a toothed roller shown in FIG. 12.

FIGS. 12 and 13 show still other embodiment of a belt-driving roller. The drawings illustrate that a toothed roller 20 according to embodiment 4 has an attaching hole 20c for a rotation shaft, wherein three toothed discs 20a, 20a, 20a of material such as SUS on which multiple tooth portions 20b are provided by laser cutting processing using laser cutting machine are welded with two cylindrical or circular spacer members 20d arranged so as to be concentric with the toothed discs, so that the tooth portions 20b on one toothed disc can be aligned with the ones of other discs, or that the tooth portions 20b on each of the toothed discs 20a, 20a, 20a can be displaced in a circumferential direction in relation to the ones on other discs, as shown in FIG. 12. Moreover, it is optional to provide an attaching cylindrical body on a central portion of each of the toothed discs 20a, 20a, 20a, as in embodiment 1. In the meantime, the spacer members 20d can be an insertion locking hole, wherein a rotation shaft is inserted on the central portion thereof, or a disc shaped component on which an attaching cylindrical body provided with the insertion locking hole is attached.

Embodiment 5

Figure 14:
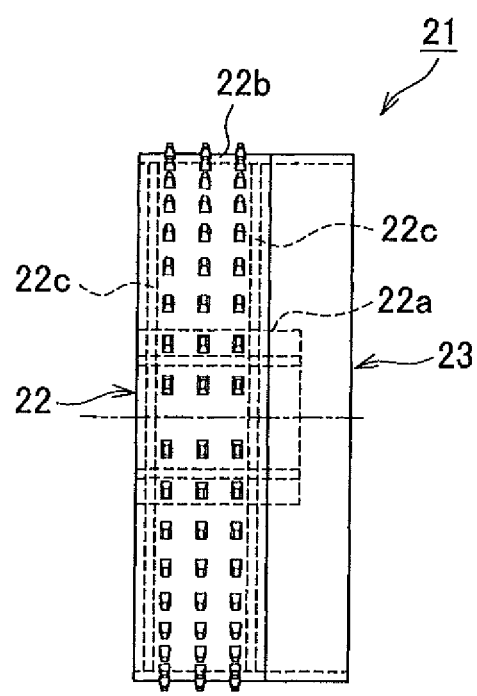
FIG. 14 is an elevation view of still other embodiment of a belt-driving roller for a wire mesh belt according to the invention.

FIG. 14 shows another embodiment of a belt-driving roller for a wire mesh belt according to the invention. The drawing illustrates that a belt-driving roller 21 according to embodiment 5 is fabricated by welding and thus integrating toothed rollers 22 with cylindrical spacer roller 23, wherein the toothed rollers 22 comprise an attaching cylindrical body 22a being attaching means of a structure as in the above-mentioned embodiments, a toothed cylindrical body 22b and lid bodies 22c, 22c being connecting members of attaching means with cylindrical spacer rollers 23. The lid bodies 22c, 22c are provided on the toothed rollers 22, but not on the spacer rollers 23. The spacer rollers 23 are merely cylindrical bodies. In this case, side plates of the spacer rollers 23 can be omitted, so that the manufacturing costs can be reduced.

Originally, each of toothed rollers 22 and each of spacer rollers 23 are separately formed and then welded with each other on respective side portions, but these rollers can be integrally formed.

Moreover, in description of each of embodiments, an outer diameter of a spacer roller is equal to that of a toothed roller without tooth portions, but the outer diameter of the spacer roller can be also smaller.

Embodiment 6

Figure 15:
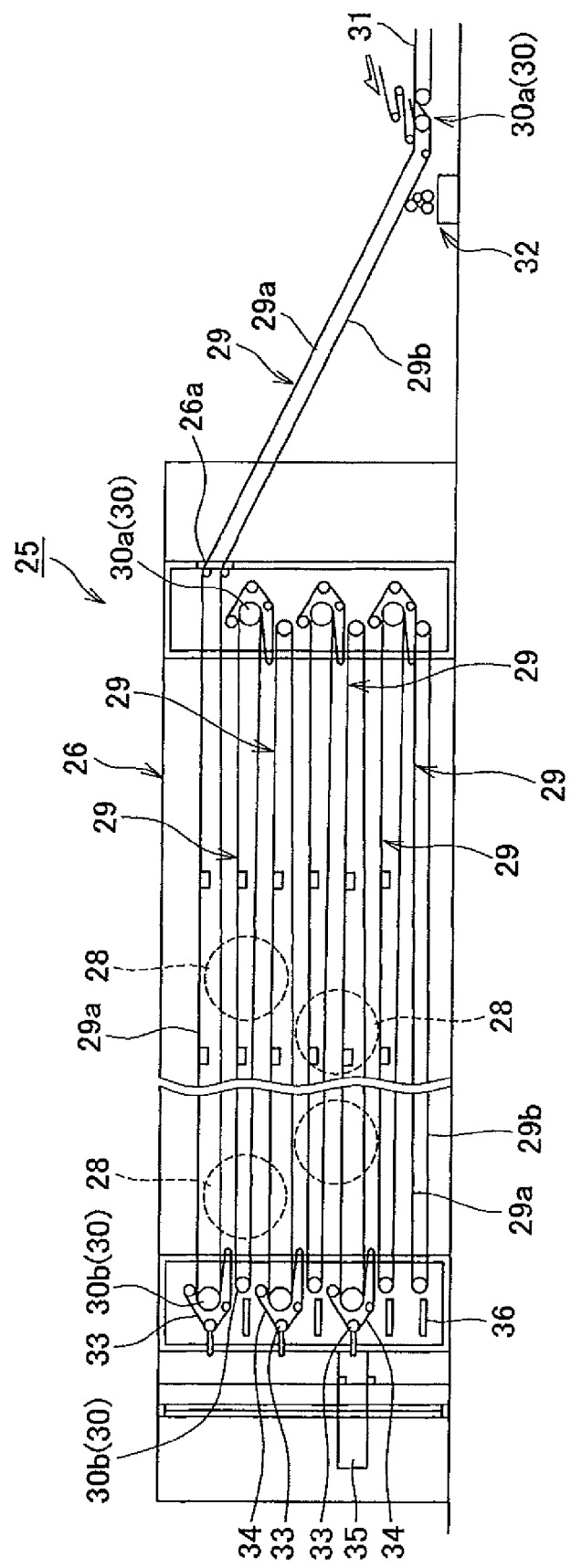
FIG. 15 is an explanatory view e.g. of a hot-air drying apparatus for dough of rice-cake confectionary as an example of a food manufacturing apparatus using a belt-driving roller according to the invention.

FIG. 15 shows a hot-air drying apparatus for dough of rice-cake confectionary as an example of food manufacturing apparatus according to the invention. The food manufacturing apparatus is, as shown in FIG. 15, a hot-air drying apparatus 25 provided with a transfer equipment according to the invention. The food manufacturing apparatus is not limited to the hot-air drying apparatus 25, but herein the hot-air drying apparatus serves as example in the following explanation.

A hot-air drying apparatus 25 as above described has a hot-air drying chamber 26 with a long box-like shape. The hot-air drying chamber 26 is covered with heat insulating materials on its circumference and has an extensive length of 80 to 200 m, thus most of the length is not included in the drawing. Multiple steam or electric heaters for heating and multiple hot-air agitation fans 28 are installed substantially over an entire length inside the hot-air drying chamber 26, while a plurality of levels of endless wire mesh belts 29, 29 of structure as above described over an entire length, occupying most of the inner volume. An endless wire mesh belt 29 of each level is respectively suspended from belt-driving rollers 30 including a driving roller 30a and a driven roller 30b and driven in a circulating manner. Only the wire mesh belt 29 of the uppermost level is guided outwards from an inlet 26a formed on an end portion of the hot-air drying chamber 26 and suspended from a belt-driving roller 30 consisting of a driven roller 30b (or otherwise a driving roller is also acceptable) installed below a transfer conveyor 31 of a dough cutting apparatus, so that pieces of food dough can be transferred from the transfer conveyor 31 onto a carrier-side belt 29a of the wire mesh belt 29.

A release agent applying apparatus 32 is provided in vicinity of a driven roller 30b of a carrier-side belt 29a and below a return-side belt 29b of the wire mesh belt 29 suspended from the driven roller 30b. The release agent applying apparatus 32 is intended to apply release agent on the surface of the return-side belt 29b on which pieces of food dough are put. The release agent applying apparatus 32 is not particularly limited, as long as it is possible to apply release agent on the surface of the return-side belt 29b. Still further, the release agent applying apparatus 32 is simultaneously used as washing apparatus for wire mesh belt.

A lower level transferring apparatus 33 for transferring food dough from a wire mesh belt 29 of one level to one on the lower level is provided on an outer circumference of a driving roller 30a of each of wire mesh belts 29 (which are alternately arranged right and left). The lower level transferring apparatus 33 is intended to transfer food dough sandwiched between the wire mesh belt 29 and a transfer endless belt 34 e.g. of canvas from a wire mesh belt 29 of one level to one on the lower level by bringing the transfer endless belt 34 into slight pressure contact with the wire mesh belt 29.

An attaching/detaching apparatus 35 for attaching/detaching a lower level transferring apparatus 33 as above described is attached to other end portion of a hot-air drying chamber 26, i.e. in vicinity of the lower level transferring apparatus 33 on the opposite side of an inlet 26a. The attaching/detaching apparatus 35 is so designed that it can move upwards and downwards in gravity direction, and attach/detach any of the lower level transferring apparatuses 33. A food dough takeout conveyor 36 for taking food dough out of the hot-air drying chamber 26 is provided below the driving roller 30a to which the lower level transferring apparatus 33 on the side of the attaching/detaching apparatus 35 is attached. In this manner, the attaching/detaching apparatus 35 and the food dough takeout conveyor 36 are provided, so that food dough can be taken out from any of the wire mesh belts 29 via the food dough takeout conveyor 36.

A wire mesh belt 29 is identical to a wire mesh belt 5 as above described. The wire mesh belt 29 has an extensive length, e.g. of a long dimension from 80 to 200 m, in case it is used in a hot-air drying apparatus 25.

Embodiment 7

Figure 16:
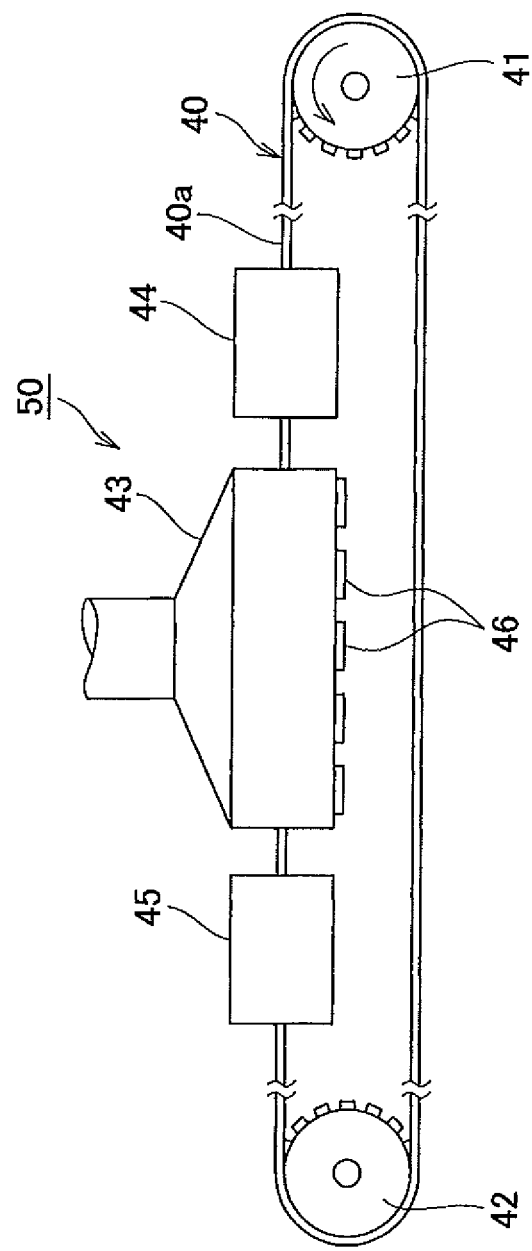
FIG. 16 is an explanatory view e.g. of a baking apparatus for dough of rice-cake confectionary as an example of a food manufacturing apparatus using a belt-driving roller according to the invention.

FIG. 16 shows a transfer equipment according to the invention as used in a baking apparatus e.g. for dough of rice-cake confectionary as other food manufacturing apparatus.

The drawing illustrates that an endless wire mesh belt 40 is suspended between a driving roller 41 to drive a belt and a driven roller 42 intended to be driven via a belt, and a part of a carrier-side belt 40a passes through the interior of a baking oven 43. A plurality of rice-cake confectionary dough (not shown) are aligned and put on an upper surface of the carrier-side belt 40a.

In the meantime, a reference numeral 44 denotes e.g. preheating gas oven, and a reference numeral 45—e.g. a browning oven, and a carrier-side belt 40a of a wire mesh belt 40 passes through the interior of both of them. A reference numeral 46 denotes a gas burner as heating means, which is connected with a baking oven 43. In the meantime, the heating means is merely an example, and dough can be heated and baked using electricity, charcoal fire and others.

If structured in the above-described manner, rice-cake confectionary dough put on the wire mesh belt 40 and passing through a baking oven 43 as shown in FIG. 16 has an effect in that it is uniformly baked and free of so-called non-uniform baking, including the pieces on both end portions.

Other food manufacturing apparatuses using a belt-driving roller according to the invention include a food dough seasoning apparatus, a vegetable drying apparatus and others.

INDUSTRIAL AVAILABILITY OF THE INVENTION

The invention is configured as above described, so that it can provide the belt-driving roller on which the wire mesh belt being a transfer means of the food manufacturing apparatus is driven in a circulating manner at low manufacturing cost, and a food manufacturing apparatus using the belt-driving roller.

EXPLANATION OF REFERENCE SYMBOLS 1, 10, 15, 21, 30, 41, 42 belt-driving roller
2, 11, 18 rotation shaft
3, 12, 16, 20, 22 toothed roller
3b, 4b insertion locking hole
3d, 4d attaching cylindrical body (attaching means)
3e lid body (attaching means, connecting means)
3g, 12a, 16a, 20b tooth portion
4, 13, 17, 23 spacer roller
4e lid body
5, 29, 40 wire mesh belt
16c insertion locking hole (attaching means)
16e, 20a toothed disc
16g, 20d spacer member
22a attaching cylindrical body (attaching means, attaching member)
22c lid body (attaching means)
25 hot-air drying apparatus
50 baking apparatus

The invention claimed is:

1. A belt-driving roller of a wire mesh belt for suspending an endless mesh belt from an outer circumference thereof and driving it in a circulating manner, said belt-driving roller comprising a rotation shaft; toothed rollers concentrically so attached to said rotation shaft that said toothed rollers are spaced from each other at a predetermined interval in axial direction of said rotation shaft; and spacer rollers so provided between the toothed rollers and concentrically attached to said rotation shaft in axial direction of said rotation shaft;

wherein said rotation shaft comprises a flange portion on one end portion thereof, and is provided with a key portion on an outer circumference of said rotation shaft in axial direction;

wherein each of said toothed rollers comprises an attaching cylindrical body having an insertion locking hole provided with a key groove engaging with said key portion, said attaching cylindrical body being attached to said rotation shaft, a pair of lid bodies spaced from each other and attached to said attaching cylindrical body, a cylindrical base material portion attached to outer circumferences of both lid bodies and provided with tooth portions in a plurality of rows on an outer circumference of said base material portion, said tooth portions being meshed with the wire mesh belt;

wherein each of said spacer rollers comprises a pair of disc-shaped lid bodies attached to said attaching cylindrical body and to said rotation shaft, wherein a receiving hole is provided on one of said disc-shaped lid bodies, said attaching cylindrical body being inserted into said receiving hole, and wherein an insertion locking hole with a key groove is provided on other of said lid bodies, said key groove engaging with said key portion, and a cylindrical body attached to outer circumferences of both lid bodies by spacing from each other at predetermined interval;

wherein each of said spacer rollers and each of said toothed rollers are arranged one after another, and all of thus arranged rollers are clamped from one end side, so that said spacer rollers and said toothed rollers are fixed to each other in axial direction of said rotation shaft.

2. The belt-driving roller of a wire mesh belt according to claim 1, wherein said tooth portions are displaced in circumferential direction on one of said toothed discs in relation to the toothed portions of another of said toothed discs.

3. The belt-driving roller of a wire mesh belt according to claim 1, wherein said spacer rollers have an outer diameter equal to that of said toothed rollers without said tooth portions.

4. The belt-driving roller of a wire mesh belt according to claim 1, wherein said toothed rollers are formed using a wire cutting machine when said tooth portions are provided on an outer circumference of the cylindrical base material portion.

5. The belt-driving roller of a wire mesh belt according to claim 1, wherein each of said toothed rollers further comprises a pair of toothed discs so attached to said outer circumference of said attaching cylindrical body that said toothed discs are spaced from each other at a predetermined interval, each of said toothed discs being provided with a plurality of tooth portions on outer circumferences thereof, and a cylindrical spacer member attached between both toothed discs, so as to be concentric with said toothed discs.

6. The belt-driving roller of a wire mesh belt according to claim 1, wherein said wire mesh belt is driven in a circulating manner using the belt-driving roller.

7. The belt-driving roller of a wire mesh belt according to claim 6, used in a food manufacturing apparatus that comprises a hot-air drying apparatus for rice-cake confectionary.

8. The belt-driving roller of a wire mesh belt according to claim 6, used in a food manufacturing apparatus that comprises a baking apparatus for rice-cake confectionary.

9. The belt-driving roller of a wire mesh belt according to claim 5, wherein said toothed rollers are formed using a laser cutting machine when said tooth portions are provided on an outer circumference of the disc-shaped base material portion.

10. The belt-driving roller of a wire mesh belt according to claim 1, wherein each of said toothed rollers further comprises a plurality of toothed discs so attached to said rotation shaft that said toothed discs are spaced from each other at a predetermined interval in axial direction, each of said toothed discs having an attaching hole provided with a key groove engaging with said key portion and being provided with a plurality of tooth portions on outer circumferences of each of said toothed discs, and a plurality of cylindrical spacer members, each of said spacer members being attached between two of said toothed discs, so as to be concentric with said toothed discs.

11. The belt-driving roller of a wire mesh belt according to claim 1, wherein the width of each of said toothed rollers in axial direction is substantially equal to that of each of said spacer rollers in axial direction.

12. The belt-driving roller of a wire mesh belt according to claim 1, wherein the width of each of said toothed rollers in axial direction is smaller than that of each of said spacer rollers in axial direction.

13. The belt-driving roller of a wire mesh belt according to claim 1, wherein one of said spacer rollers adjacent at least to one side of one of said toothed rollers is firmly fixed to said one side of one of said toothed rollers.

14. The belt-driving roller of a wire mesh belt according to claim 1, for use in a food manufacturing apparatus, wherein said wire mesh belt is driven in a circulating manner using the belt-driving roller.

15. The belt-driving roller of a wire mesh belt according to claim 14, wherein said food manufacturing apparatus is a hot-air drying apparatus for rice-cake confectionary.

16. The belt-driving roller of a wire mesh belt according to claim 14, wherein said food manufacturing apparatus is a baking apparatus for rice-cake confectionary.

* * * * *